US00RE48934E

(19) United States
(12) Reissued Patent
Liu et al.

(10) Patent Number: US RE48,934 E
(45) Date of Reissued Patent: Feb. 15, 2022

(54) WIRELESS LAN DEVICE POSITIONING

(71) Applicant: MARVELL WORLD TRADE LTD, St. Michael (BB)

(72) Inventors: Bochih Liu, Shanghai (CN); Zhike Jia, Fremont, CA (US); Yuan Ren, Shanghai (CN); Jing Yu, Shanghai (CN); Jian Chen, Shanghai (CN); Xing Zhao, Shanghai (CN)

(73) Assignee: Marvell Asia Pte, Ltd., Singapore (SG)

(21) Appl. No.: 15/927,237

(22) Filed: Mar. 21, 2018

Related U.S. Patent Documents

Reissue of:
(64) Patent No.: 9,521,568
Issued: Dec. 13, 2016
Appl. No.: 14/536,926
Filed: Nov. 10, 2014

U.S. Applications:
(60) Provisional application No. 61/906,054, filed on Nov. 19, 2013.

(51) Int. Cl.
*H04J 1/16* (2006.01)
*H04W 24/08* (2009.01)
(Continued)

(52) U.S. Cl.
CPC ..... *H04W 24/08* (2013.01); *G01S 5/0252* (2013.01); *H04W 64/00* (2013.01); *H04W 84/12* (2013.01)

(58) Field of Classification Search
CPC ..... H04W 24/08; H04W 64/00; H04W 84/12; G01S 5/0252
See application file for complete search history.

(56) References Cited

U.S. PATENT DOCUMENTS 6,324,473 B1 * 11/2001 Eschenbach ..... G01S 19/071 701/470
7,113,794 B2 * 9/2006 Annamalai ..... G01S 19/09 455/456.1
(Continued)

FOREIGN PATENT DOCUMENTS

CN 101620267 1/2010
CN 101620267 A 1/2010 ..... G01S 5/02
(Continued)

*Primary Examiner* — Roland G Foster

(57) ABSTRACT

A system and method to determine a location of a device in a wireless local area network (LAN) based on positioning assistance data acquired from a server is disclosed. The host-offload wireless LAN device may determine a location based on the location computations done inside the wireless LAN module. The device includes a storage medium configured to provide a database of positioning assistance data, a wireless LAN module configured to receive beacon signals broadcast from one or more access points, and a processor configured to store the access point identification information and the signal strength detected by the wireless LAN module in a first memory section, access the previously-stored positioning assistance data from the storage medium, assemble positioning assistance data based on a comparison, store the assembled positioning assistance data in a second memory section, and determine a location of wireless LAN device using assembled positioning assistance data.

20 Claims, 4 Drawing Sheets

(51) Int. Cl.

| | |
|---|---|
| ***H04W 64/00*** | (2009.01) |
| ***G01S 5/02*** | (2010.01) |
| *H04W 84/12* | (2009.01) |

(56) References Cited

U.S. PATENT DOCUMENTS

| | | | | |
|---|---|---|---|---|
| 7,898,472 | B2 * | 3/2011 | Zeng | G01S 5/0289 342/357.34 |
| 7,961,141 | B2 * | 6/2011 | Dai | G01S 19/41 342/357.29 |
| 7,982,667 | B2 * | 7/2011 | Vollath | G01S 19/32 342/357.24 |
| 8,004,462 | B2 * | 8/2011 | LaMance | G01S 19/27 342/357.66 |
| 8,031,111 | B2 * | 10/2011 | Ferguson | G01S 19/04 342/357.4 |
| 8,077,085 | B2 * | 12/2011 | Huang | G01S 19/41 342/357.46 |
| 8,125,382 | B2 * | 2/2012 | Derbez | G01S 19/258 342/357.66 |
| 8,130,143 | B2 * | 3/2012 | Liu | G01S 19/44 342/357.44 |
| 8,134,497 | B2 * | 3/2012 | Janky | G01S 19/07 342/357.24 |
| 8,818,401 | B2 * | 8/2014 | Gupta | G01S 5/0236 455/411 |
| 9,125,021 | B2 * | 9/2015 | Gupta | G01S 5/0236 |
| 9,131,459 | B2 * | 9/2015 | Tenny | H04W 4/02 |
| 9,148,763 | B2 * | 9/2015 | Gupta | H04W 4/04 |
| 9,197,998 | B2 * | 11/2015 | Liu | H04W 4/023 |
| 9,204,260 | B2 * | 12/2015 | Mehta | H04W 4/043 |
| 9,250,327 | B2 * | 2/2016 | Kelley | G01S 19/074 |
| 2005/0110676 | A1 * | 5/2005 | Heppe | G01S 19/13 342/357.34 |
| 2006/0095349 | A1 | 5/2006 | Morgan et al. | |
| 2006/0106850 | A1 * | 5/2006 | Morgan | G01S 5/0284 |
| 2007/0004427 | A1 * | 1/2007 | Morgan | H04W 64/003 455/456.1 |
| 2007/0202888 | A1 * | 8/2007 | Brachet | G01S 5/02 455/456.1 |
| 2007/0258421 | A1 * | 11/2007 | Alizadeh-Shabdiz | G01S 11/06 370/338 |
| 2008/0191936 | A1 * | 8/2008 | Phatak | G01S 19/05 342/357.42 |
| 2009/0082034 | A1 | 3/2009 | Gray et al. | H04W 24/00 1/20 |
| 2009/0167599 | A1 * | 7/2009 | Johnson | H04W 4/02 342/357.48 |
| 2010/0105399 | A1 * | 4/2010 | Akerlund | H04W 16/18 455/446 |
| 2011/0021207 | A1 * | 1/2011 | Morgan | G01S 5/0205 455/456.1 |
| 2014/0094199 | A1 * | 4/2014 | Palanki | G01S 19/05 455/456.5 |
| 2014/0323163 | A1 * | 10/2014 | Venkatraman | G01S 5/0252 455/457 |
| 2014/0351886 | A1 * | 11/2014 | Edge | G06F 21/60 726/3 |
| 2015/0031307 | A1 * | 1/2015 | Gao | H04W 24/10 455/67.11 |
| 2015/0296359 | A1 * | 10/2015 | Edge | H04W 4/22 455/404.2 |
| 2015/0301189 | A1 * | 10/2015 | Berchin | G01S 19/43 342/357.23 |

FOREIGN PATENT DOCUMENTS

| | | | |
|---|---|---|---|
| CN | 101742545 | 6/2010 | |
| CN | 101742545 A | 6/2010 | H04W 24/04 |
| WO | WO2005/004527 | 1/2005 | |

* cited by examiner

WIRELESS LAN DEVICE POSITIONING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This disclosure claims priority to and benefit from U.S. Provisional Patent Application No. 61/906,054, filed on Nov. 19, 2013, the entirety of which is incorporated herein by reference.

FIELD

This disclosure relates in general to the field of assisted positioning systems. More specifically, the disclosure relates to systems for positioning a wireless local area network (LAN) device.

BACKGROUND

A wireless mobile device can include one or more location-aware applications that are configured to perform location based tasks such as store finding and transit routing. Location-aware applications depend on positioning systems to determining a location of a wireless mobile device. One example of a positioning system is configured to incorporate a satellite positioning system receiver in a wireless mobile device and to specify a real-time location of the wireless mobile device by use of only signals from satellites in view. Satellite positioning systems can provide high accuracy, but require a clear line of sight between satellites and the wireless mobile device. In open sky areas where satellite positioning signals are not obstructed, the wireless mobile device can receive sufficient line of sight signals from satellites. However, satellite positioning systems are largely ineffective while a wireless mobile device is in shadow areas or in buildings. Further, receiving and processing satellite positioning signals may consume substantial energy and hence shorten battery duration.

Recent proliferation of access points in wireless local area networks (LANs) has made it possible for wireless mobile devices to use these access points as an alternative positioning system for location determination.

SUMMARY

In accordance with the teachings described herein, systems and methods are provided for determining a location of a wireless local area network (LAN) device. A system includes a server, comprising: a storage medium configured to provide a database of location data, each location data associating position information of a location with an access point identification information for providing wireless communication at the location and the strength of a signal received at the location; and a processor configured to determine an access point location-related parameters using a group of location data, check whether the location-related conditions are satisfied for determining the positioning assistance data, identify, when the location-related conditions are satisfied, specific access point using the identifier to retrieve the group of location data from the database, determine the positioning assistance data using the group of location data, store the positioning assistance data, and transmit the positioning assistance data to one or more wireless LAN devices.

In one embodiment, the system includes a wireless LAN device for determining a location, comprising: a storage medium configured to provide a database of positioning assistance data, each positioning assistance data associating an access point identification information with an access point location, one or more polynomial coefficients, and a workable range of signal strength; a wireless LAN module configured to receive beacon signals broadcast from one or more access points that receives identifiers and the strength of the signals from one or more access points; and a processor configured to store the access point identification information and the signal strength detected by the wireless LAN module in a first memory section, access the previously-stored positioning assistance data from the storage medium, assemble positioning assistance data based on a comparison, store the assembled positioning assistance data in a second memory section, and determine a location of wireless LAN device using assembled positioning assistance data.

In another embodiment, a method is provided for determining a location of a wireless LAN device, comprising: providing, by a storage medium coupled to a server, a database of location data, each location data associating position information of a location with an access point identification information for providing wireless communication at the location and the strength of a signal received at the location; determining an access point location-related parameters using a group of location data; checking whether the location-related conditions are satisfied for determining the positioning assistance data; identifying, when the location-related conditions are satisfied, specific access point using the identifier to retrieve the group of location data from the database; determining the positioning assistance data using the group of location data; storing the positioning assistance data; and transmitting the positioning assistance data to one or more wireless LAN devices.

In yet another embodiment, a method is provided for determining a location of a wireless LAN device, comprising: providing, a storage medium coupled to a wireless LAN device, a database of positioning assistance data, each positioning assistance data associating an access point identification information with an access point location, one or more polynomial coefficients, and a workable range of signal strength; receiving, by a wireless LAN module coupled to a wireless LAN device, beacon signals broadcast from one or more access points that receives identifiers and the strength of the signals from one or more access points; storing the access point identification information and the signal strength detected by the wireless LAN module in a first memory section; accessing the previously-stored positioning assistance data from the storage medium; assembling positioning assistance data based on a comparison; storing the assembled positioning assistance data in a second memory section; and determining a location of wireless LAN device using assembled positioning assistance data.

DETAILED DESCRIPTION

Figure 1:
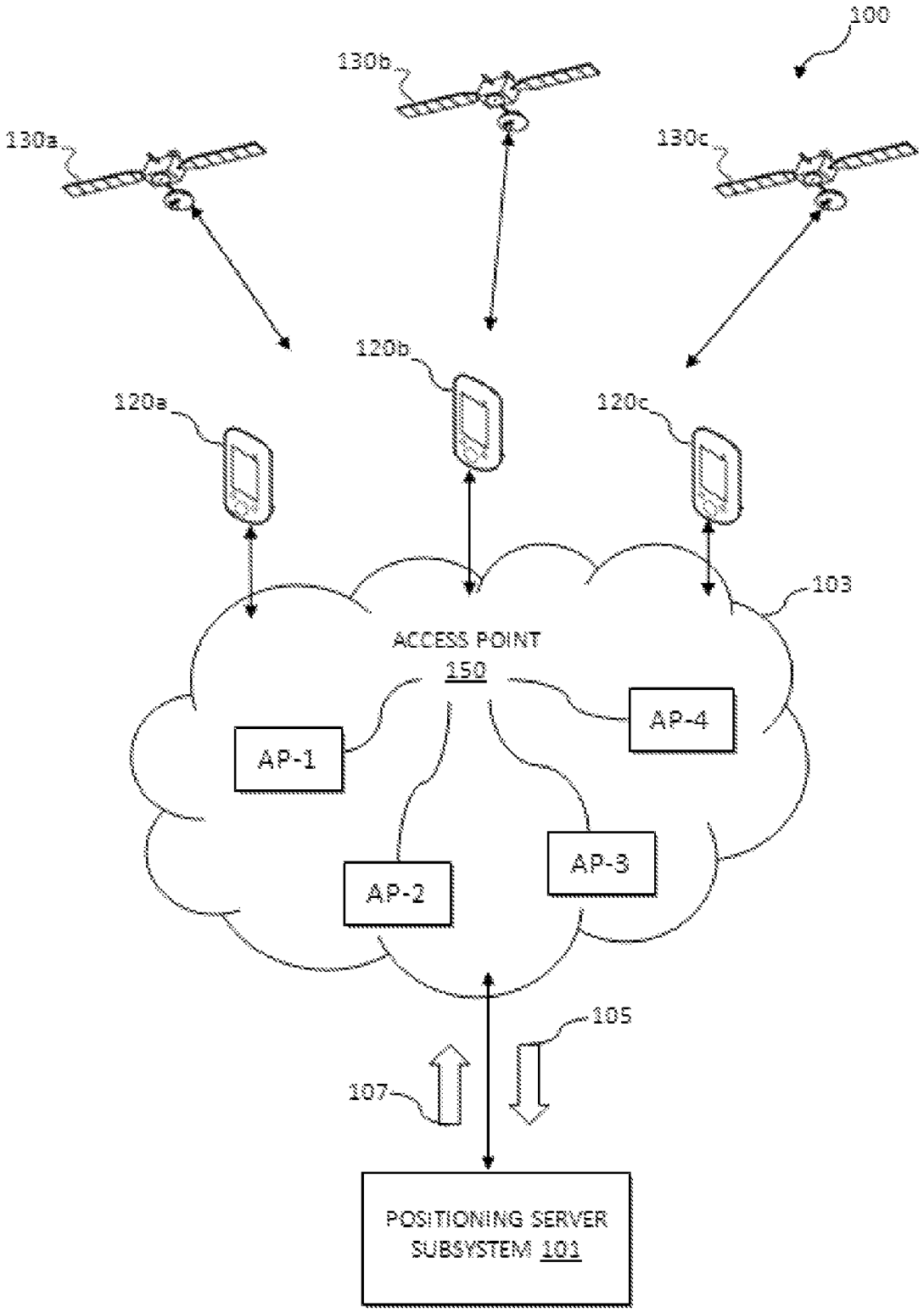
FIG. 1 is an example diagram illustrating a location system for positioning a wireless local area network (LAN) device according to some embodiments of the disclosure.

FIG. 1 illustrates an example location system 100 for positioning a wireless local area network (LAN) device according to some embodiments of the disclosure. In some embodiments, the system 100 may determine a location of a wireless LAN device using a group of positioning assistance data when wireless LAN device interacts with one or more access points. In some embodiments, the system 100 may determine positioning assistance data for an access point using a group of location data associated with the access point. Each positioning assistance data associates an access point identification information (e.g., Media Access Control (MAC) address) with an access point location, one or more polynomial coefficients, and a workable range of the signal strength. In the offline training phase, the system 100 may determine one or more polynomial coefficients based on the strength of the signals in the group of location data using polynomial regression method. In response to determining polynomial coefficients, the system 100 may determine the workable range of the signal strength in accordance with the relationship on the decay law of the signal strength versus distance. In some embodiments, the system 100 may periodically determine a location of an access point using the group of location data associated with the access point. Each location data typically associates position information of a location with an identifier of the access point for providing wireless communication at the location and the strength of a signal received at the location. In the online determining phase, the system 100 may estimate a distance between wireless LAN device and access point using the determined polynomial coefficients when the strength of the signal received at the location from access point is within the workable range. In some embodiments, the system 100 may determine a location of wireless LAN device using the locations of access points to which the wireless LAN device can communicate wirelessly, by triangulating its position based on the estimated distances between wireless LAN device and access points.

According to some embodiments of the disclosure, the location system 100 includes one or more computers programmed to determine positioning assistance data for an access point using the group of location data associated with the access point. As illustrated in FIG. 1, the location system 100 includes a positioning server subsystem 101 communicatively coupled to wireless LAN devices 120a, 120b, and 120c via a wireless network 103. The wireless network 103 includes access points 150, such as access points AP-1 to AP-4, configured to communication with the wireless LAN devices 120a, 120b, and 120c via wireless signals. It should be noted that the wireless network 103 may also include cellular stations (not shown) configured to wirelessly communication with wireless LAN devices 120a, 120b, and 120c for transferring data, inasmuch as a modern wireless LAN device may incorporate functions of both cellular and wireless LAN transceivers.

The access points 150 may communicate with the wireless LAN devices 120a, 120b, and 120c using various communication protocols. For purpose of discussion herein, access points 150 may operate in accordance with the Institute of Electrical and Electronics Engineers (IEEE) 802.11 family of standards, and can be any suitable wireless network devices including, for example, routers, gateways, hubs, base stations, or the like. In some embodiments, access points 150 may operate according to other suitable wireless standards such as the IEEE 802.15 based Bluetooth communication protocol.

The access point 150 may have a communication range from less than ten meters to several hundred meters, depending upon factors such as environmental conditions and the configuration of access point. The access point 150 may broadcast a beacon signal providing an identifier (e.g., MAC address) for multiple wireless LAN devices (e.g., 120a, 120b, and 120c) to connect to it when wireless LAN devices 120a, 120b, and 120c are within a communication range of access point. In turn, multiple access points (e.g., AP-1 to AP-4) may be available to a wireless LAN device (e.g., 120a) for connection. Those identifiers need not be associated with access points to which wireless LAN device is connected or can connect. For example, wireless LAN device at a particular location (e.g., an airport, a shopping mall, an office building, and so on) can be within communication range of, for example, one to 20 access points. Wireless LAN device may be capable of connecting to fewer access points than are within range (due to, for example, security setting of the access points and wireless LAN device). Wireless LAN device may be actively connected to one or multiple access points, or no access points at all. Regardless of whether the wireless LAN device is connected to the access point, all identifiers of the access points received by wireless LAN device can be used in the location estimate.

The wireless LAN devices 120a, 120b, and 120c can be any type of devices, such as smart phone, tablet computer, wearable electronic device, and the like. One or more wireless LAN devices may install with a satellite positioning system receiver. Accordingly, the wireless LAN devices are configured to determine current locations based on, for example, signals from satellites 130a, 130b, and 130c, triangulating signals from access points 150, or other techniques. Further, the wireless LAN devices with the satellite positioning system receiver installed is configured to periodically transmit location data 105 to the positioning server subsystem 101. For example, a wireless LAN device 120a determines its location using its on-board satellite receiver, receives identifiers and the strength of the signals at the location from access points 150 within communication range of that wireless LAN device, converts to location data 105 in a format, and transmits location data 105 to the positioning server subsystem 101 via a wireless network 103.

A more detailed description of operation of the FIG. 1 elements according to some embodiments of the disclosure follows. The positioning server subsystem 101 may include any software, hardware, firmware, or combination thereof configured to determine positioning assistance data 107 for an access point using a group of location data associated with the access point. In some embodiments, the positioning server subsystem 101 may receive, from multiple wireless LAN devices, location data identifying both locations of wireless LAN devices during a configurable time period and access points within communication range at those locations.

In response to receiving location data 105, the positioning server subsystem 101 may aggregate location data in a group for an access point and determine location-related parameters using the group of location data associated with the access point. For example, the determined location-related parameters may include the following: determining an estimated location of an access point; determining an estimated uncertainty associated with the estimated location of the access point; and determining the coverage area length of the access point and the transmission signal range of the access point. In some embodiments, the positioning server subsystem 101 may periodically determine positioning assistance data 107 for an access point in accordance with various conditions. The conditions can be location-related parameters as the number of the group of location data associated with the access point, an estimated uncertainty associated with the estimated location of the access point, and the coverage area length of the access point. When the location-related conditions are satisfied, the positioning server subsystem 101 may use the polynomial regression method to determine one or more polynomial coefficients based on the strength of the signals in the group of location data associated with the access point. In response to determining polynomial coefficients, the positioning server subsystem 101 may determine the workable range of the signal strength according to the relationship on the decay law of the signal strength versus distance using the strength of the signals in the group of location data associated with the access point.

The wireless LAN devices 120a, 120b, and 120c may include any hardware, software, firmware, or combination thereof configured to determine a location in response to identifying access points 150 within communication range. In some embodiments, the wireless LAN device (e.g., 120a) may receive, from the positioning server subsystem 101, a group of positioning assistance data 107 identifying access points 150. It is noted that although the wireless LAN devices 120a, 120b, and 120c are shown in communication with the positioning server subsystem 101, the wireless LAN devices need not be constantly receiving the group of positioning assistance data 107. Rather, communication may be established when necessary. For example, the positioning server subsystem 101 may forward the group of positioning assistance data 107 to wireless LAN devices 120a, 120b, and 120c as the devices move from one to another geographic region.

The wireless LAN device (e.g., 120a) may detect identifiers of access points 150 within communication range and compare identification information for each of the detected access points to the access point identification information in the group of positioning assistance data 107. For example, the wireless LAN device 102a may compare MAC address for each of access points 150 to MAC addresses of access points included in the group of positioning assistance data 107. If the any of the detected access point identification information match identification information for access points in the group of positioning assistance data 107, the wireless LAN device 120a may determine its location. In some embodiments, the wireless LAN device may estimate a distance between wireless LAN device and the detected access point using the determined polynomial coefficients when the strength of the signal received at the location from the detected access point is within the workable range. In some embodiments, the wireless LAN device 120a may determine a location using the locations of the detected access points to which the wireless LAN device 120a can communicate wirelessly, by triangulating its position based on the estimated distances between wireless LAN device and the detected access points.

Figure 2:
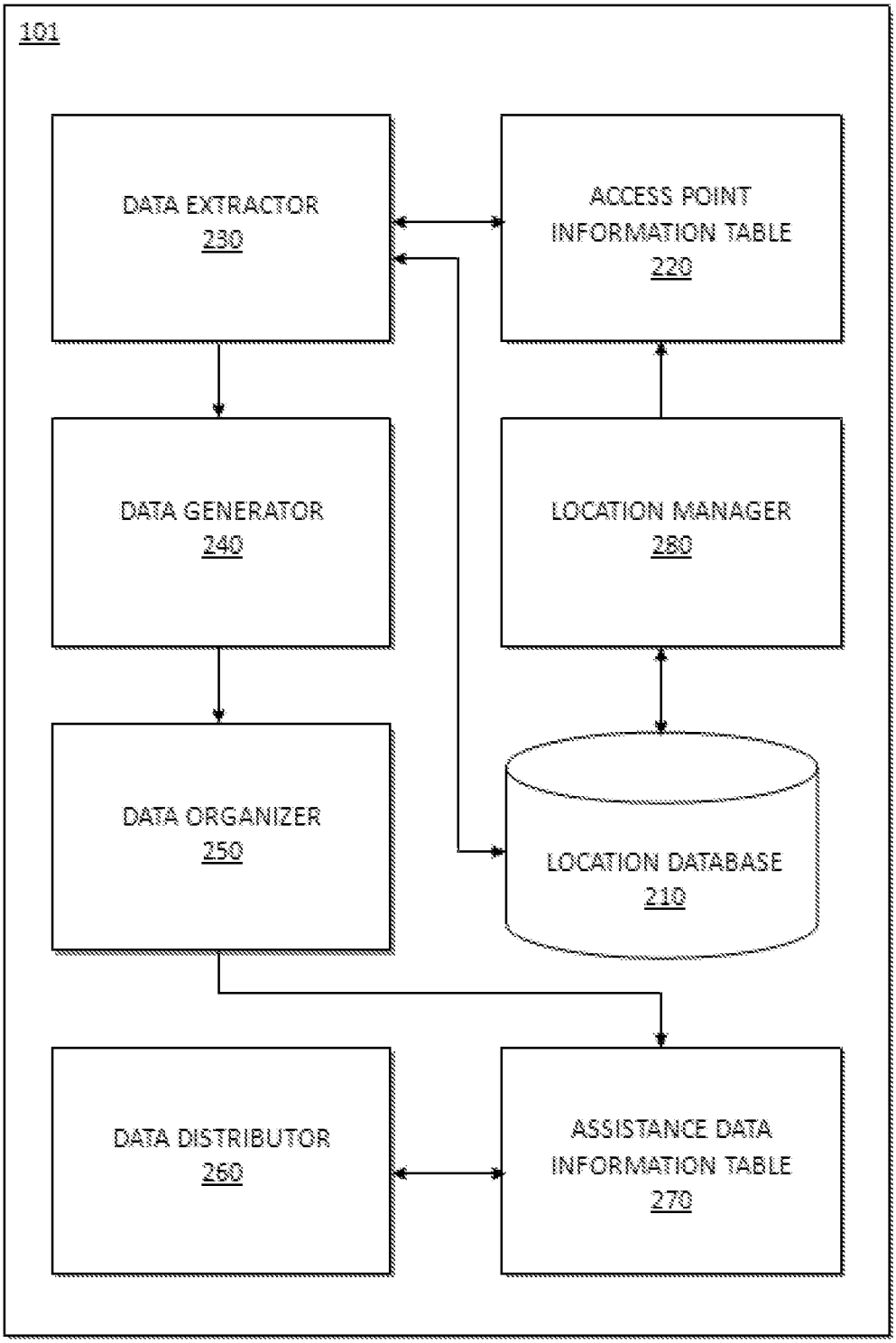
FIG. 2 is an example diagram illustrating a positioning server for determining positioning assistance data using a group of location data according to some embodiments of the disclosure.

FIG. 2 illustrates an example positioning server 101 for determining positioning assistance data using a group of location data associated with an access point according to some embodiments of the disclosure. The positioning server 101 is a subsystem of system 100 as described in reference of FIG. 1. As shown in FIG. 2, positioning server subsystem 101 may include a series of components, each of which may include any hardware, software, firmware, or combination thereof configured to provide specific functionality.

As previously mentioned, the positioning server 101 may determine positioning assistance data 107 for an access point using a group of location data 105 associated with the access point. For example, the positioning server 101 may receive, from multiple wireless LAN devices 120a, 120b, and 120c, location data identifying both locations of wireless LAN devices during a configurable time period (the wireless LAN devices 120a, 120b, and 120c are configured to determine current locations using signals from satellites 130a, 130b, and 130c) and access points within communication range at those locations. Accordingly, the positioning server 101 may include a location database 210 configured to store location data for one or more access points from multiple wireless LAN devices. The positioning server 101 may include an access point information table 220 configured to store or otherwise identify one or more of information for each access point: identifier; estimated location and associated uncertainty; coverage area length; transmission signal range; time; date; or others.

According to some embodiments of the disclosure, the positioning server 101 may include a data extractor 230. The data extractor 230 may periodically monitor the access point information table 220 to determine whether the location-related conditions are satisfied for determining the positioning assistance data. For example, the location-related conditions can be the number of the group of location data associated with an access point exceeding a predefined threshold, an estimated uncertainty associated with the estimated location of the access point less than a predefined threshold (e.g., 100 meters), and the coverage area length of the access point less than a predefined threshold (e.g., 300 meters). When the location-related conditions are satisfied, the data extractor 230 may use the identifier (e.g., MAC address) of the access point in the access point information table 220 as an identification to extract the group of location data for the access point from the location database 210. Regardless, the data extractor 230 passed the group of location data to a data generator 240.

The positioning server 101 may include a data generator 240. The data generator 240 may determine one or more polynomial coefficients using polynomial regression method. The method fits $n^{th}$-degree polynomial based on the strength of the signals in the group of location data using least squares approximation. The $n^{th}$-degree polynomial should satisfy:

$$\hat{r}_i = \sum_{j=0}^{n} a_j s_i^j = a_0 + a_1 s_i + a_2 s_i^2 + \ldots + a_n s_i^n \quad (1)$$

where $\hat{r}_i$ is the $n^{th}$-degree polynomial related to a distance between wireless LAN device and access point i, $s_i$ is the strength of the signal in the group of location data received from access point i, $a_j$ with j=0, 1, 2, . . . , n are the coefficients of the polynomial, and i=1, 2, . . . , N is the number of the group of location data associated with access point i. Given N location data $(\hat{r}_i, s_i)$, N equations are formulated. There are estimation errors $e_i$. The data generator 240 may determine the polynomial coefficients by minimizing the sum of the error squares $E(a_0, a_1, \ldots, a_n) = \Sigma_{i=1}^{N} (e_i)^2$. The data generator 240 may equate its partial derivatives to zero with respect to $a_0, a_1, \ldots, a_n$. Then, the normal equations are given by $$\sum_{i=1}^{N} s_i^j r_i = a_0 \sum_{i=1}^{N} s_i^j + a_1 \sum_{i=1}^{N} s_i^{j+1} + \ldots + a_n \sum_{i=1}^{N} s_i^{j+n}. \tag{2}$$

The data generator 240 may solve the polynomial coefficients $a_j$, with j=0, 1, 2, . . . , n, by Gauss elimination. Specifically, the data generator 240 derives and selects, for example, a $3^{rd}$-degree polynomial coefficient (i.e., $a_0, a_1, a_2$).

In response to determining polynomial coefficients, the data generator 240 may determine a workable range of the signal strength according to the relationship on the decay law of the signal strength versus distance using the strength of the signals in the group of location data. For example, the data generator 240 may analyze the distribution of strength of the signals in the group of location data to associate a workable range. The workable range may be based on a probability 0.95 or others.

The positioning server 101 may include a data organizer 250. The data organizer 250 may organize and maintain an assistance data information table 270 for storing the positioning assistance data associated with access points. The positioning assistance data for an access point consists of access point identification information (e.g., MAC address), access point location, the polynomial coefficients, and the workable range of the signal strength. The assistance data information table 270 can be a database or a data repository.

The positioning server 101 may include a data distributor 260. The data distributor 260 may perform the positioning assistance data retrieval and transmit the positioning assistance data to one or more wireless LAN devices over any wireless and wired networks, in a pull, push, automatic or combination over a communication interface. The communication interface may include HTTP (Hyper Text Transfer Protocol), TCP/IP (Transmission Control Protocol/Internet Protocol), UDP (User Datagram Protocol), WAP (Wireless Application Protocol), or others. In some embodiments, the positioning assistance data retrieval may be based on a reference coordinate of wireless LAN device to define a geographical area. For example, the reference coordinate of wireless LAN device may be determined by a satellite positioning system, a wireless network positioning system, or other techniques. The geographical area can be depicted by a circle, rectangle, square, hexagon, or other enclosed regions.

As described above, the positioning server 101 may receive location data from multiple wireless LAN devices interacting with an access point. The location data may be passed to the location database 210 for storing historical locations for multiple wireless LAN devices within communication range of an access point. Specifically, the location database 210 stores the geographic coordinates of multiple wireless LAN devices and the strength of the signals received at those coordinates. The location database 210 can be organized under a hierarchical folder structure, the folders mapping to directories in the file system. The location data may be stored in the location database of any suitable format. For example, the location data are stored in a format to facilitate extracting a group of location data associated with an access point. In some embodiments, the strength of the signal received at each coordinate can be used to determine a closeness between wireless LAN device and access point. The closeness may indicate a coarse measure of distance between wireless LAN device and access point. For example, a higher strength of the signal received at a coordinate from access point may provide a larger closeness.

The positioning server 101 may include a location manager 280. The location manager 280 may include any hardware, software, firmware, or combination thereof configured to perform a location determination of an access point in response to an event. For example, the event for starting a determination procedure may be based on time, expiration of a time period (e.g., 24 hours), an application request, or others.

The location manager 280 may apply an adaptive two-level process by performing the closeness analysis to location data in the location database 210 to determine a location for an access point. For example of the first-level process, the location manager 280 may determine a coarse location based on the group of location data for an access point and select a first data set from the group of location data according to closeness analysis. For example of the second-level process, the location manager 280 may determine a finer location for an access point in response to a first data set and select a second data set from the first data set according to closeness analysis. The location manager 280 may determine an estimated location for an access point using weight-average method. The location manager 280 stores the estimated location in the access point information table 220. For each estimated location, the location manager 280 may determine an estimated uncertainty associated with the estimated location and a coverage area length for each access point. It is noted that the location manager 280 may use other algorithms for determining an estimated location for an access point without departing from the scope of this disclosure.

Figure 3:
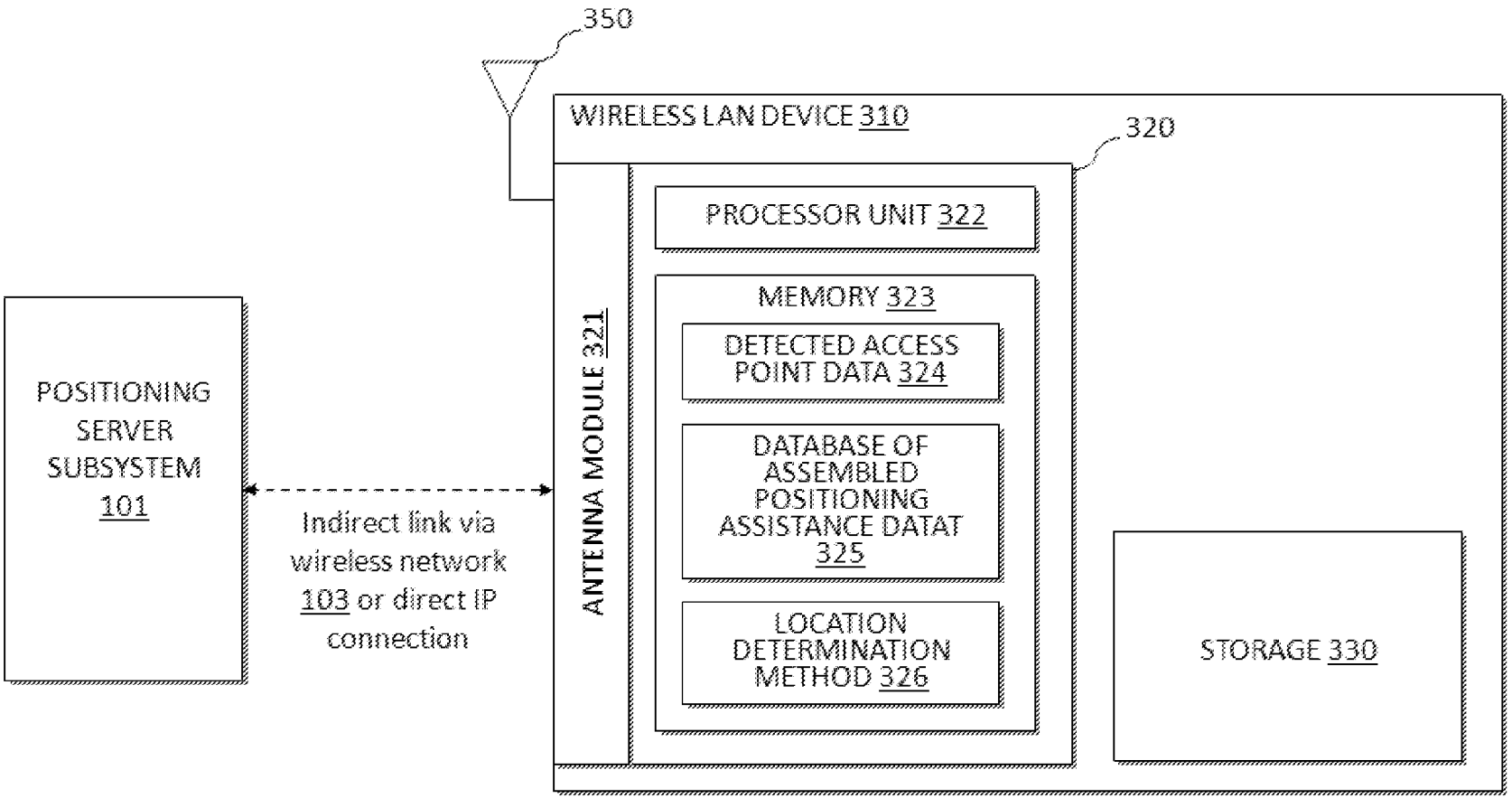
FIG. 3 is an example diagram illustrating a wireless LAN device for determining a location using a group of positioning assistance data according to some embodiments of the disclosure.

FIG. 3 illustrates an example diagram illustrating a host-offload wireless LAN device for determining a location using positioning assistance data according to some embodiments of the disclosure. The wireless LAN device is a device as described in reference of FIG. 1. As shown in FIG. 3, wireless LAN device may include a series of components, each of which may include any hardware, software, firmware, or combination thereof configured to provide specific functionality.

The host-offload wireless LAN device 310 may determine a location based on the location computations done inside the wireless LAN module 320. Specifically, the wireless LAN device 310 comprises a wireless LAN module 320 and a storage 330. The wireless LAN module 320 includes an antenna module 321 in which the wireless LAN signals are acquired through an antenna 350, a processor unit 322, and a memory 323. The processor unit may be implemented in a number of ways without limiting the applicability of the disclosure. These include, but are not limited to: microprocessors, field programmable gate arrays (FPGAs), or application-specific integrated circuits (ASICs). The memory can be a non-volatile memory configured to comprise a section 324 containing the most recently detected access point data, a database 325 of assembled positioning assistance data obtained as a result of comparison, and a section 326 for location determination according to the methods later discussed with reference to FIG. 4. The processor unit 322 is configured to execute the software code. The memory 323 stores software codes, which may be retrieved by the processor unit 322 for execution. The stored software codes in section 326 of memory comprise a positioning code, including a functional module for detecting access point data, a functional module for assembling positioning assistance data based on the detected access point data, and a functional module for determining a location based on assembled positioning assistance data.

The storage 330 stores positioning assistance data included in a geographic region received from a data distributor 260 in positioning server subsystem 101 via an interface (not shown). In some embodiments, the interface may enable an indirect link to positioning server subsystem 101, for example, via wireless network 103. The interface can be for example an antenna module (not shown) embedded in a cellular module (not shown) of the wireless LAN device 310 and support an access to a cellular communication network, or it can be an antenna module 321 embedded in a wireless LAN module 320 of the wireless LAN device 310 and support an access to a wireless LAN. Alternatively, it can support wireless links using any other kind of technology. In some embodiments, the interface may enable a direct link to positioning server subsystem 101. The interface may support IP (Internet Protocol) connection. The IP connection is a system by which data is sent from one host to another host through a network (e.g., the Internet).

Figure 4:
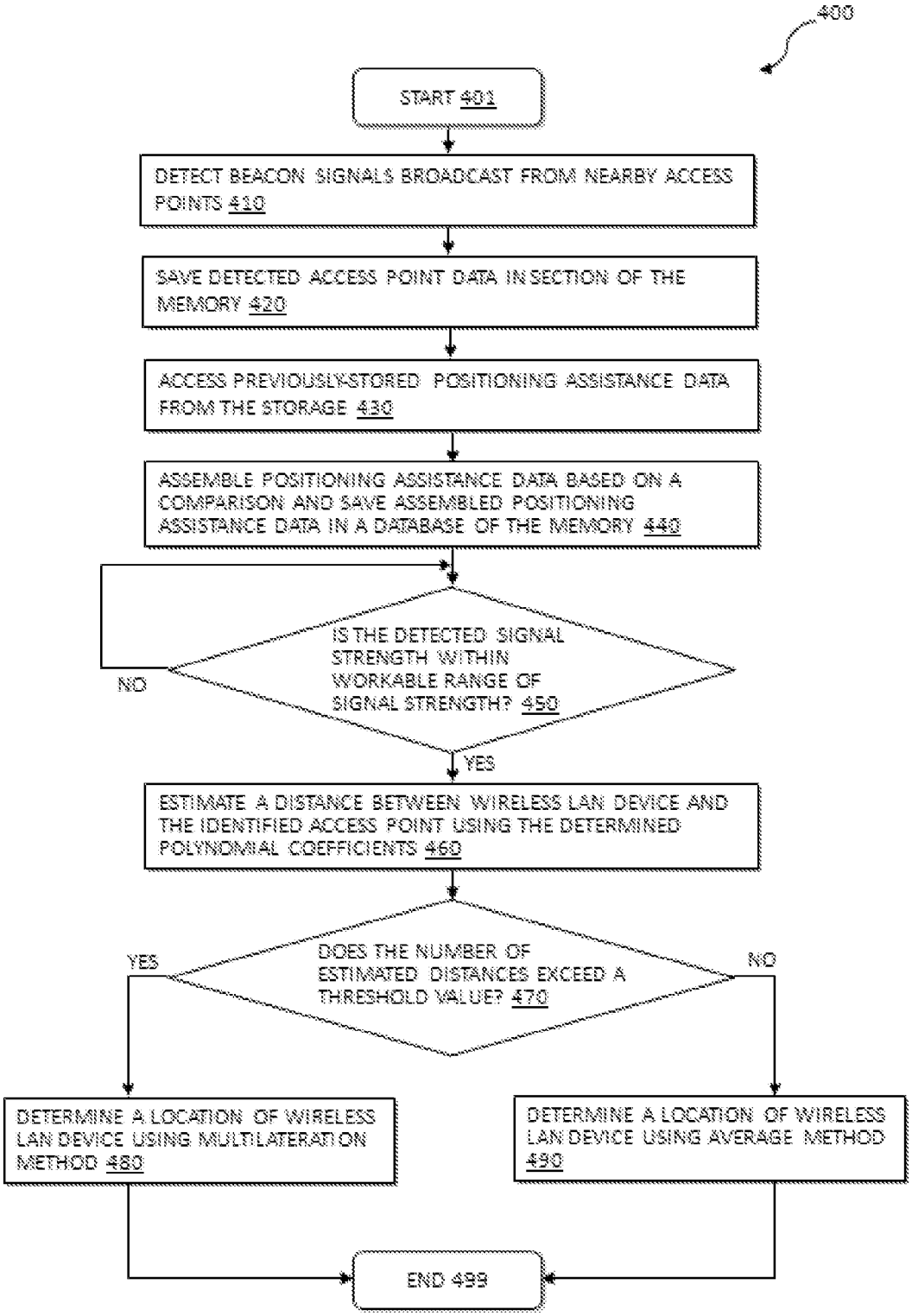
FIG. 4 is an example flow chart illustrating an exemplary operation in the wireless LAN device for location determination according to some embodiments of the disclosure.

An exemplary operation in the host-offload wireless LAN device 310 is described below with respect to the illustrative flow chart 400 of FIG. 4. For this example, the wireless LAN module 320 receives the location request instruction from the application via user interface (not shown). In some embodiments, the wireless LAN module 320 may operate in a low power state until receipt of the location request instruction, which causes the wireless LAN module 320 to transition to an operational state. In operation, the process starts at 401 and proceeds to 410.

At 410, the wireless LAN module 320 causes an antenna module 321 to scan signals from the environment through its antenna 350 in response to receiving location request instruction. For example, the scan may include receiving the beacon signals broadcast from nearby access points. The signals provide identifiers (e.g., MAC addresses) at the location and the strength of the signals received at the location.

At 420, the processor unit 322 uses the functional module of detecting access point data code in section 326 of memory for analyzing the beacon signals acquired from the antenna module 321 in order to identify each of the nearby access points that sent beacon signals to the wireless LAN device 310. Once identified, the processor unit 322 saves the detected access point data in section 324 of the memory. The access point data may include a list of access point identification information and signal strength as determined during the scan. The access point data for multiple access point measurements may be referred as the wireless access point fingerprints.

At 430, the processor unit 322 uses the functional module of assembling positioning assistance data code in section 326 of memory for accessing previously-stored positioning assistance data from the storage 330. The previously-stored positioning assistance data may include access point identification information that can be stored as specifically corresponding with known geographic regions.

At 440, the processor unit 322 uses the functional module of assembling positioning assistance data code in section 326 of memory for comparing the detected access point data obtained from the section 324 of the memory to the previously-stored positioning assistance data. The processor unit 322 compares the detected access point identification information to previously-stored access point identification information. Based on the comparison, the processor unit 322 assembles positioning assistance data if the any of the detected access point identification information match identification information for access points included in the positioning assistance data, and saves assembled positioning assistance data in a database 325 of the memory. The assembled positioning assistance data may be suited for supporting a location determination of the wireless LAN device 310. Each assembled positioning assistance data associates an access point identification information with an access point location, the polynomial coefficients, the workable range of the signal strength, and the signal strength as determined during the scan.

At 450, the processor unit 322 uses the functional module of determining a location code in section 326 of memory for determining whether the detected signal strength during the scan is within the workable range of the signal strength in order to identify each of the assembled positioning assistance data that can be used for determining a location of the wireless LAN device 310. Once identified, the process proceeds to 460.

At 460, the processor unit 322 uses the functional module of determining a location code in section 326 of memory for estimating distances between wireless LAN device 310 and the identified access points using the determined polynomial coefficients associated with each of the identified access points. For this example, assume that the number of access points (e.g., K access points) is identified. K sets of assembled positioning assistance data are used to form K sets of equations that correspond to K sets of distance polynomials. A distance polynomial is determined as follows:

$$\hat{d}_i = \sum_{j=0}^{n} a_j s_i^j = a_0 + a_1 s_i + a_2 s_i^2 + \ldots + a_n s_i^n \tag{3}$$

where $\hat{d}_i$ is the distance polynomial related to a distance between wireless LAN device 310 and the identified access point i, $s_i$ is the signal strength received from the identified access point i during the scan, $a_j$ with j=0, 1, 2, . . . , n are the polynomial coefficients associated with the identified access point i, and i=1, 2, . . . , K is the number of the identified access points. As mentioned previously, a $3^{th}$-degree polynomial coefficient (i.e., $a_0$,$a_1$,$a_2$) has selected and can be used for distance estimate.

At 470, the processor unit 322 uses the functional module of determining a location code in section 326 of memory for determining whether the number of estimated distances exceeds a threshold value (e.g., 3). Specifically, when the number of estimated distances exceeds the threshold value, the process proceeds to 480. Conversely, when the number of estimated distances does not exceed the threshold value, the process proceeds to 490.

At 480, the processor unit 322 uses the functional module of determining a location code in section 326 of memory for determining a location of wireless LAN device 310 that can be based on multilateration method. This method uses the locations of the identified access points to which the wireless LAN device 310 can communicate wirelessly during the scan and the estimated distances between wireless LAN device 310 and the identified access points to formulate a non-linear least squares. It can be viewed as an optimization problem where the objective is to minimize the sum of the square error. This is a nonlinear least squares problem and usually involves iterative searching techniques such as gradient descent method, Newton method, or other related iterative methods to get the location determination. Then, the process proceeds to 499 and terminates.

At 490, the processor unit 322 uses the functional module of determining a location code in section 326 of memory for determining a location of wireless LAN device 310 that can be based on average method. This method averages the locations of the identified access points to which the wireless LAN device 310 can communicate wirelessly during the scan as a result of location determination. Then, the process proceeds to 499 and terminates.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A system for determining a location of a wireless local area network (LAN) device, the system comprising:

a server, comprising:

a storage medium configured to provide a database of location data, each location data associating position information of a location with an access point identification information for providing wireless communication at the location and strength of a signal received at the location; and a processor configured to:

determine access point location-related parameters using a group of location data;

check whether location-related conditions are satisfied for determining positioning assistance data;

identify, when the location-related conditions are satisfied, a specific access point using the access point identification information to retrieve the group of location data from the database;

determine the positioning assistance data using the group of location data;

store the positioning assistance data; *and* transmit the positioning assistance data to one or more wireless LAN devices; *and* a wireless LAN device comprising:

a storage medium configured to provide a database of the positioning assistance data, each positioning assistance data associating an access point identification information with an access point location, one or more polynomial coefficients, and a workable range of signal strength;

a wireless LAN module configured to receive beacon signals broadcast from one or more access points that receives identifiers and strengths of signals from one or more access points; and a processor configured to:

store the access point identification information and the signal strength detected by the wireless LAN module in a first memory section;

access the previously-stored positioning assistance data from the storage medium;

assemble positioning assistance data based on a comparison;

store the assembled positioning assistance data in a second memory section; and determine a location of *the* wireless LAN device using assembled positioning assistance data.

2. The system of claim 1, wherein the processor determines the access point location-related parameters, comprising:

determine an estimated location of an access point;

determine an estimated uncertainty associated with the estimated location of the access point; and determine a coverage area length for the access point.

3. The system of claim 2, wherein the location-related conditions are satisfied when the number of the group of the location data exceeds a predefined threshold, the estimated uncertainty is less than a predefined threshold, and the coverage area length is less than a predefined threshold.

4. The system of claim 1, wherein the processor determines the positioning assistance data based on strengths of the signals in the group of location data, comprising:

determine one or more polynomial coefficients through a least squares fit;

in response to determining polynomial coefficients, determine a workable range of the signal strength by analyzing the distribution of strength of the signals to associate a probability 0.95.

5. The system of claim 1, wherein the previously-stored positioning assistance data is stored in association with known geographic regions.

6. The system of claim 1, wherein the processor assemble positioning assistance data by comparing the detected access point identification information to previously-stored access point identification information included in previously-stored positioning assistance data, each assembled positioning assistance data associating an access point identification information with an access point location, one or more polynomial coefficients, a workable range of signal strength, and a detected signal strength.

7. The system of claim 1, wherein the processor determines a location of wireless LAN device, comprising:

determine whether the detected signal strength is within the workable range of the signal strength in order to identify each of the assembled positioning assistance data that can be used for location determination;

once identified, estimate a distance between wireless LAN device and the identified access point using the determined polynomial coefficients; and determine whether the number of determined distances exceeds a threshold value.

8. The system of claim 7, further comprising:

determine a location based on iteratively estimating method using the locations of identified access points and the determined distances when the number of determined distances exceeds a threshold value.

9. The system of claim 7, further comprising:

determine a location based on average method using the locations of identified access points when the number of determined distances does not exceed a threshold value.

10. A method for determining a location of a wireless LAN device, the method comprising:

providing, by a storage medium coupled to a server, a database of location data, each location data associating position information of a location with an access point identification information for providing wireless communication at the location and strength of a signal received at the location;

determining access point location-related parameters using a group of location data;

checking whether location-related conditions are satisfied for determining positioning assistance data;

identifying, when the location-related conditions are satisfied, a specific access point using the access point identification information to retrieve the group of location data from the database;

determining the positioning assistance data using the group of location data;

storing the positioning assistance data;

transmitting the positioning assistance data to one or more wireless LAN devices;

providing, *at* a storage medium coupled to a wireless LAN device, a database of the positioning assistance data, each positioning assistance data associating an access point identification information with an access point location, one or more polynomial coefficients, and a workable range of signal strength;

receiving, by a wireless LAN module coupled to a wireless LAN device, beacon signals broadcast from one or more access points that receives identifiers and strengths of the signals from one or more access points;

storing the access point identification information and the signal strength detected by the wireless LAN module in a first memory section;

accessing the previously-stored positioning assistance data from the storage medium;

assembling positioning assistance data based on a comparison;

storing the assembled positioning assistance data in a second memory section; and determining a location of *the* wireless LAN device using assembled positioning assistance data.

11. The method of claim 10, wherein determining the access point location-related parameters, comprising:

determining an estimated location of an access point;

determining an estimated uncertainty associated with the estimated location of the access point; and determining a coverage area length for the access point.

12. The method of claim 11, wherein the location-related conditions are satisfied when the number of the group of the location data exceeds a predefined threshold, the estimated uncertainty is less than a predefined threshold, and the coverage area length is less than a predefined threshold.

13. The method of claim 10, wherein determining the positioning assistance data based on the strengths of the signals in the group of location data, comprising:

determining one or more polynomial coefficients through a least squares fit;

in response to determining polynomial coefficients, determining a workable range of the signal strength by analyzing the distribution of strength of the signals to associate a probability 0.95.

14. The method of claim 10, wherein the previously-stored positioning assistance data is stored in association with known geographic regions.

15. The method of claim 10, wherein assembling positioning assistance data by comparing the detected access point identification information to previously-stored access point identification information included in previously-stored positioning assistance data, each assembled positioning assistance data associating an access point identification information with an access point location, one or more polynomial coefficients, a workable range of signal strength, and a detected signal strength.

16. The method of claim 10, wherein determining a location of wireless LAN device, comprising:

determining whether the detected signal strength is within the workable range of the signal strength in order to identify each of the assembled positioning assistance data that can be used for location determination;

once identified, estimating a distance between wireless LAN device and the identified access point using the determined polynomial coefficients; and determining whether the number of determined distances exceeds a threshold value.

17. The method of claim 16, further comprising:

determining a location based on iteratively estimating method using the locations of identified access points and the determined distances when the number of determined distances exceeds a threshold value.

18. The method of claim 16, further comprising:

determining a location based on average method using the locations of identified access points when the number of determined distances does not exceed a threshold value.

19. A method performed by a positioning server for use with access points through which mobile devices wirelessly communicate with a network, the method comprising:

receiving data sets from the mobile devices, each data set including (i) a location of a respective one of the wireless devices, (ii) an identification of an access point from which the respective wireless device receives a signal, and (iii) a signal strength of the received signal;

estimating, from the data sets, a location for each access point;

determining, from the data sets, for each access point, a coefficient for an equation for calculating distance from the access point's estimated location as a function of signal strength;

selecting access points from among the access points; *and* transmitting, to a mobile device *selected* from among the mobile devices, the coefficient for each selected access point, for the mobile device to use the coefficient, along with the equation and received signal strengths from the selected access points, to estimate a location of the mobile device.

20. The method of claim 19, wherein the location in each data set is determined by the respective mobile device through satellite positioning, and the use of the coefficients by the mobile device includes triangulation.

* * * * *